(12) United States Patent
Shimada

(10) Patent No.: US 11,437,933 B2
(45) Date of Patent: Sep. 6, 2022

(54) VIBRATION WAVE MOTOR AND ELECTRONIC APPARATUS HAVING AN ELECTRICAL-MECHANICAL ENERGY CONVERSION ELEMENT

(71) Applicant: CANON KABUSHIKI KAISHA, Tokyo (JP)

(72) Inventor: Akira Shimada, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/883,751

(22) Filed: May 26, 2020

(65) Prior Publication Data

US 2020/0382023 A1    Dec. 3, 2020

(30) Foreign Application Priority Data

May 30, 2019    (JP) .............................. JP2019-101748

(51) Int. Cl.
*H02N 2/00*    (2006.01)
*H02N 2/02*    (2006.01)

(52) U.S. Cl.
CPC .......... *H02N 2/0015* (2013.01); *H02N 2/006* (2013.01); *H02N 2/0065* (2013.01); *H02N 2/026* (2013.01)

(58) Field of Classification Search
CPC .... H02N 2/0015; H02N 2/006; H02N 2/0065; H02N 2/026; H02N 2/0055; H02N 2/103; H02N 2/043; H04N 5/2254; H04N 5/2253; H04N 5/2251; H04N 5/23212; H04N 5/235; G02B 9/34; G02B 7/28; G02B 7/10

See application file for complete search history.

(56) References Cited

U.S. PATENT DOCUMENTS

| 6,242,846 B1 | 6/2001 | Takatoshi | |
|---|---|---|---|
| 8,736,143 B2* | 5/2014 | Araki | H02N 2/103 310/323.13 |
| 2010/0176687 A1* | 7/2010 | Nagaoka | H01L 41/053 310/323.16 |
| 2015/0137663 A1* | 5/2015 | Kimura | H02N 2/0015 310/323.02 |
| 2017/0207725 A1* | 7/2017 | Kojima | H02N 2/026 |
| 2018/0097459 A1* | 4/2018 | Osawa | H02N 2/0015 |

FOREIGN PATENT DOCUMENTS

| EP | 2242123 A2 | 10/2010 |
|---|---|---|
| JP | 11-235062 A | 8/1999 |
| JP | 2009-106153 A | 5/2009 |
| JP | 2015-043668 A | 3/2015 |
| JP | 2017-200260 A | 11/2017 |

* cited by examiner

*Primary Examiner* — Emily P Pham
(74) *Attorney, Agent, or Firm* — Canon U.S.A., Inc. IP Division

(57) ABSTRACT

A vibration wave motor includes a vibrator including an electrical-mechanical energy conversion element and an elastic member, a contact member in contact with the elastic member, and a supporting member that supports the vibrator, wherein the supporting member supports an outer periphery portion of the vibrator so as to be movable along a direction in which the vibrator is pressed toward the contact member, and selectively supports a node of a vibration of the vibrator.

11 Claims, 13 Drawing Sheets

MODE A

MODE B

VIBRATION WAVE MOTOR AND ELECTRONIC APPARATUS HAVING AN ELECTRICAL-MECHANICAL ENERGY CONVERSION ELEMENT

BACKGROUND OF THE INVENTION

Field of the Invention

The present invention relates to a vibration wave motor and an electronic apparatus.

Description of the Related Art

Various structures of a vibration wave motor that uses an electrical-mechanical energy conversion element are known. For example, a vibration wave motor that includes a driven member, a vibrator, and a pressing unit is known. The vibrator includes two projections on a front surface of a plate-shaped elastic member and a piezoelectric element joined onto a rear surface of the elastic member, and the pressing unit brings the two projections and the driven member into pressure contact with each other. In the vibration wave motor, a predetermined alternating-current voltage is applied to the electrical-mechanical energy conversion element to cause elliptic motion or circular motion at tips of the two projections in a plane that includes a direction connecting the two projections and a projecting direction of the projections. Consequently, the driven member receives a friction driving force from the two projections so that the vibrator and the driven member are relatively moved in the direction connecting the two projections.

From the viewpoint of stabilizing driving characteristics and realizing high performance of a vibration wave motor, it is important to employ a mechanism that stably holds a vibrator so that the amplitude of a vibration excited by the vibrator is not attenuated. There are various vibrator holding mechanisms having been discussed. For example, Japanese Patent Application Laid-Open No. 2015-43668 discusses a mechanism for holding a vibrator that includes a vibration plate and a piezoelectric element. The mechanism includes a holding member that holds the vibrator and a fixed member that supports the holding member. One of the holding member and the fixed member includes a fitting projection, and the other one includes a positioning hole that receives the fitting projection. The fitting projection is inserted into the positioning hole so that the holding member is supported by the fixed member so as to be movable in a projecting direction of a projection of the vibrator.

Joints at tips of two arm portions extending in a longitudinal direction of the vibration plate are bonded or welded to the holding member to hold the vibrator. The joints are designed to be nodes or node neighborhoods with a small vibration amplitude so that attenuation of vibrations of the vibrator is prevented.

Further, Japanese Patent Application Laid-Open No. 2017-200260 discusses a technique for increasing controllability and positioning accuracy by bringing a biasing spring into contact with a holding member and applying a greater biasing force than a driving force in a relative movement direction.

However, with the vibrator holding mechanism discussed in Japanese Patent Application Laid-Open No. 2015-43668, an issue arises that the size in a relative movement direction of the vibrator increases.

Since the joints of the vibration plate are designed to coincide with node positions, the holding mechanism extends significantly in the longitudinal direction of the vibration plate, and the size is increased by the extension. With a structure in which the vibrator is placed on a ring-shaped base, the vibrator may protrude in a tangential direction, so that there are constraints on the design of the vibration plate. With a structure in which the vibrator is moved linearly, the size of the holding mechanism in the movement direction is increased by the length of the joints and the arm portions.

Furthermore, the shape of the vibrator discussed in Japanese Patent Application Laid-Open No. 2015-43668 is disadvantageous from the viewpoint of protection against abnormal noise. As described above, since the joints are designed to coincide with vibration nodes, the arm portions have a long structure. Furthermore, in order to prevent transmission of vibrations to the joints, the arm portions have a narrower structure than a transverse direction of the vibration plate and the joints. Since the arm portions are designed to have low rigidity, the number of unnecessary vibration modes including frequencies of an audible range increases, and this causes abnormal noise. To prevent excitation of the unnecessary vibration modes, constraints are imposed on the design of a peripheral structure including the driven member.

There is another issue that the number of components is great. To stably achieve high performance, first and second holding members and a buffer member are used. The technique discussed in Japanese Patent Application Laid-Open No. 2017-200260 uses the biasing spring in addition to the above-described components. Accordingly, the number of components other than the components necessary for driving is increased.

The present invention is directed to a vibration wave motor that is smaller in size, includes fewer components, and has a lower risk of producing abnormal noise than the conventional vibration wave motor.

SUMMARY OF THE INVENTION

According to an aspect of the present invention, a vibration wave motor includes a vibrator including an electrical-mechanical energy conversion element and an elastic member, a contact member in contact with the elastic member, and a supporting member that supports the vibrator, wherein the supporting member supports an outer periphery portion of the vibrator so as to be movable along a direction in which the vibrator is pressed toward the contact member, and selectively supports a node of a vibration of the vibrator.

The present invention is made in view of the above-described issues and is directed to a vibration wave motor that is smaller in size, includes fewer components, and has a lower risk of producing abnormal noise than conventional vibration wave motors.

Further features of the present invention will become apparent from the following description of exemplary embodiments with reference to the attached drawings.

DESCRIPTION OF THE EMBODIMENTS

To solve the above-described issues, a vibration wave motor according to an exemplary embodiment of the present invention includes a vibrator including an electrical-mechanical energy conversion element and an elastic member, a contact member in contact with the elastic member, a pressing member that applies a pressing force to the contact member and the vibrator, and a supporting member that supports the vibrator. The supporting member supports an outer periphery portion of the vibrator so as to be movable along a pressing direction, and selectively supports a node of a vibration of the vibrator.

The vibration wave motor can have a structure in which the supporting member supports an area of the vibrator with a displacement that is not greater than 35% of a maximum displacement in a standing-wave vibration of the vibrator. Further, the vibration wave motor can have a structure in which the elastic member is substantially rectangular and includes a rectangular portion and at least two extending portions that are independent of each other, and the supporting member includes a projection in contact with the rectangular portion and the extending portions.

Further, the vibration wave motor can have a structure in which the plurality of projections is loosely fitted to four corners of the rectangular portion of the elastic member to support the vibrator.

Various exemplary embodiments of the present invention will be described in detail below with reference to the drawings.

Figure 1:
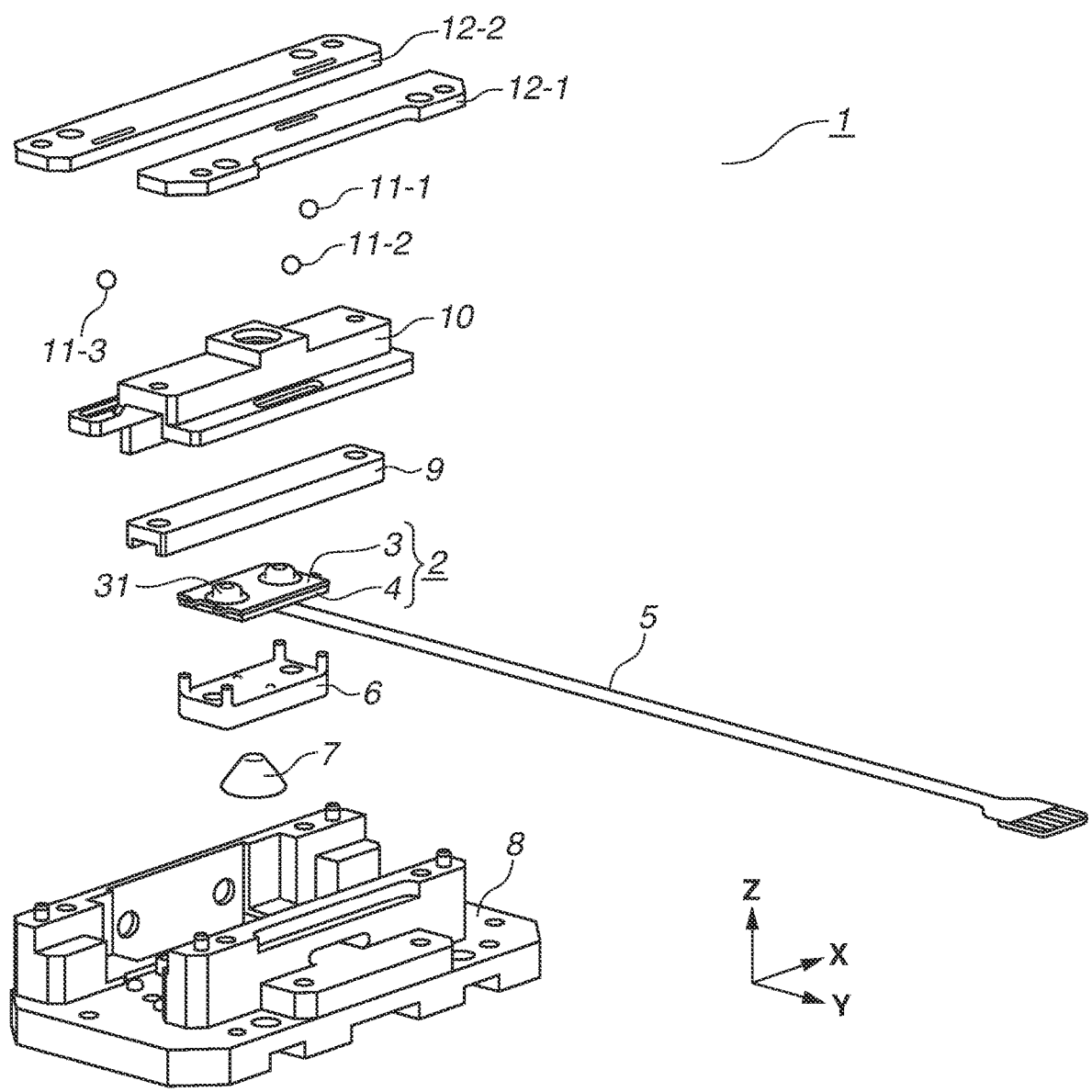
FIG. 1 is an exploded perspective view illustrating a vibration wave motor according to a first exemplary embodiment of the present invention.
Figure 2:
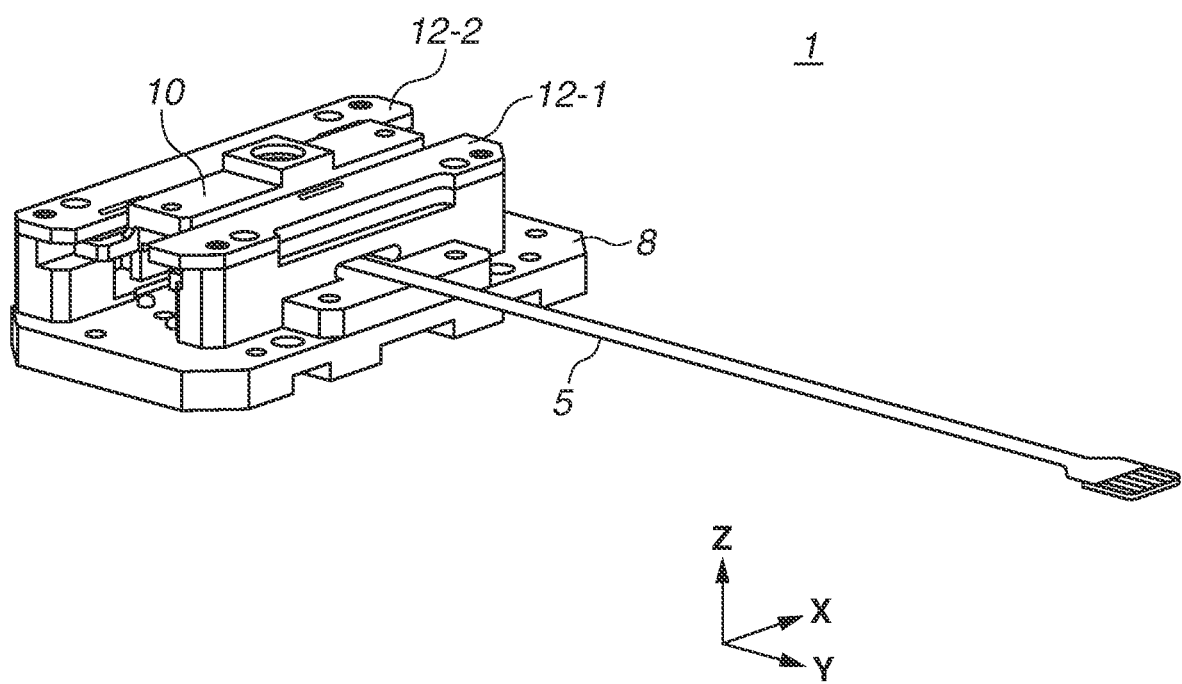
FIG. 2 is an assembly perspective view illustrating the vibration wave motor according to the first exemplary embodiment of the present invention.

A first exemplary embodiment is an example of an application of the present invention to a linear-type vibration wave motor that moves linearly, and details thereof will be described with reference to FIGS. 1 to 7. First, FIG. 1 is an exploded perspective view illustrating a vibration wave motor 1 according to the first exemplary embodiment of the present invention, and FIG. 2 is an assembly perspective view illustrating the vibration wave motor 1. A movement direction of a slider 9, which is a contact member, is defined as an X-direction, a pressing direction as a Z-direction, and a direction that is perpendicular to the directions X and Z as a Y-direction.

An elastic member 3 and a piezoelectric element 4, which is an electrical-mechanical energy conversion element, are fixed together with an adhesive to form a vibrator 2. Further, a flexible print substrate 5 is fixed to the piezoelectric element 4 on the opposite side of the elastic member 3, whereby the vibrator 2 is formed. The flexible print substrate 5 is fixed using an anisotropic conductive paste or an anisotropic conductive film that permits conduction only in the Z-direction.

A desirable material of the elastic member 3 is a material with low vibration attenuation, such as a metal or ceramic. In manufacturing the elastic member 3, a projection 31 may be formed integrally by press molding or cutting, or the projection 31 may be manufactured separately and then fixed by welding or bonding. Further, more than one projection 31 may be provided as in the present exemplary embodiment, or only one projection 31 may be provided.

The piezoelectric element 4 contains, for example, lead zirconate titanate. Further, the piezoelectric element 4 may contain a lead-free piezoelectric material, such as barium titanate or bismuth sodium titanate, as a main component. The term "lead-free" refers to a lead content of 1000 ppm or less. An electrode pattern (not illustrated) is formed on each of both surfaces of the piezoelectric element 4, and power is fed from the flexible print substrate 5. A pressing member 6, a pressing spring 7, and a base 8 are provided as a supporting member that supports the vibrator 2. The base 8 receives a pressing force from the pressing spring 7.

More specifically, the pressing member 6, which presses and supports the vibrator 2, is disposed under the vibrator 2. The pressing spring 7 applies a pressing force in the Z-direction to the pressing member 6, and the reaction force is received by the base 8, which is a pressing force reception member. A conical coil spring is employed as the pressing spring 7 to reduce the size of the vibration wave motor 1 in the Z-direction. The coil shape is simplistically illustrated.

The slider 9, which is a contact member, is disposed on top of the vibrator 2 and is in pressure contact with the projection 31 of the elastic member 3. The slider 9 is fixed to a slider holder 10, and the slider 9 and the slider holder 10 are driven together in the X-direction. A rubber for vibration attenuation may be disposed between the slider 9 and the slider holder 10. The slider 9 is composed of a material having high wear resistance, such as a metal, ceramic, resin, or composite material thereof. Especially, a material generated by nitriding stainless steel, such as SUS420J2, is desirable from the viewpoint of wear resistance and mass production.

Three balls 11 are placed between three pairs of upper and lower rails of the slider holder 10 and a ball rail 12 (12-1 and 12-2), and the ball rail 12 is fixed to the base 8 so that the slider 9 and the slider holder 10 are movable in the X-direction with respect to the other components. An output transmission unit of a desired shape is attached to the slider holder 10 to externally transmit the output. While the example in which the vibrator 2 is fixed, and the slider 9 is movable is described in the present exemplary embodiment, it is also possible to fix the slider 9 and move the vibrator 2.

Figure 3A:
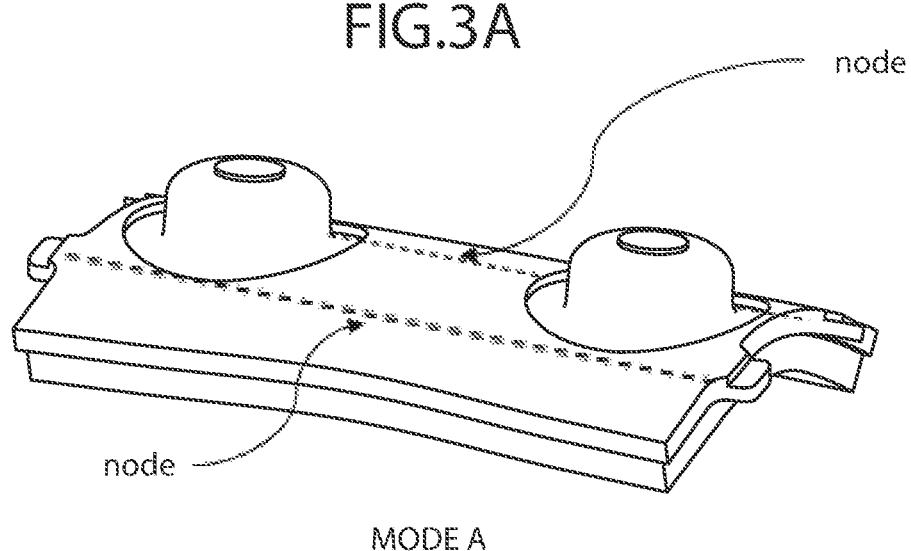
FIGS. 3A and 3B are views illustrating vibration modes according to the first to third exemplary embodiments of the present invention.
Figure 3B:
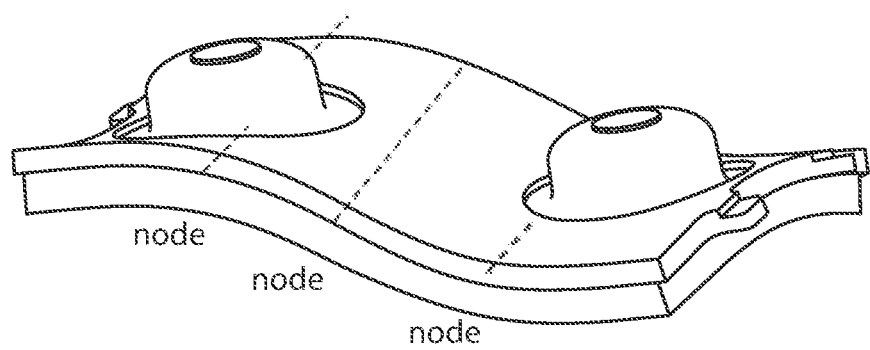

Next, vibration modes that are excited in the vibrator 2 will be described with reference to FIGS. 3A and 3B. In the present exemplary embodiment, an alternating-current voltage is applied to the piezoelectric element 4 via the flexible print substrate 5 so that two different out-of-plane bending vibrations are excited in the vibrator 2, and the vibrations are combined to generate a vibration.

A mode A (see FIG. 3A) is a first vibration mode and is a primary out-of-plane bending vibration mode in which two nodes parallel in the X-direction (longitudinal direction of the vibrator 2) appear. A vibration in the mode A displaces, in the Z-direction (pressing direction), projections 31-1 and 31-2 at two positions. A mode B (see FIG. 3B) is a second vibration mode and is a secondary out-of-plane bending vibration mode in which three nodes substantially parallel in the Y-direction (transverse direction of the vibrator 2) appear. A vibration in the mode B displaces, in the X-direction, the projections 31-1 and 31-2 at two positions.

The vibrations in the modes A and B are combined so that the projections 31-1 and 31-2 at two positions conduct elliptic motion or circular motion in a ZX-plane. The slider 9 is brought into pressure contact with the projections 31-1 and 31-2 so that a frictional force is generated in the X-direction and a driving force (thrust force) that relatively moves the vibrator 2 and the slider 9 is generated. In the present exemplary embodiment, since the vibrator 2 is held by a method described below, the slider 9 is moved in the X-direction.

Figure 4:
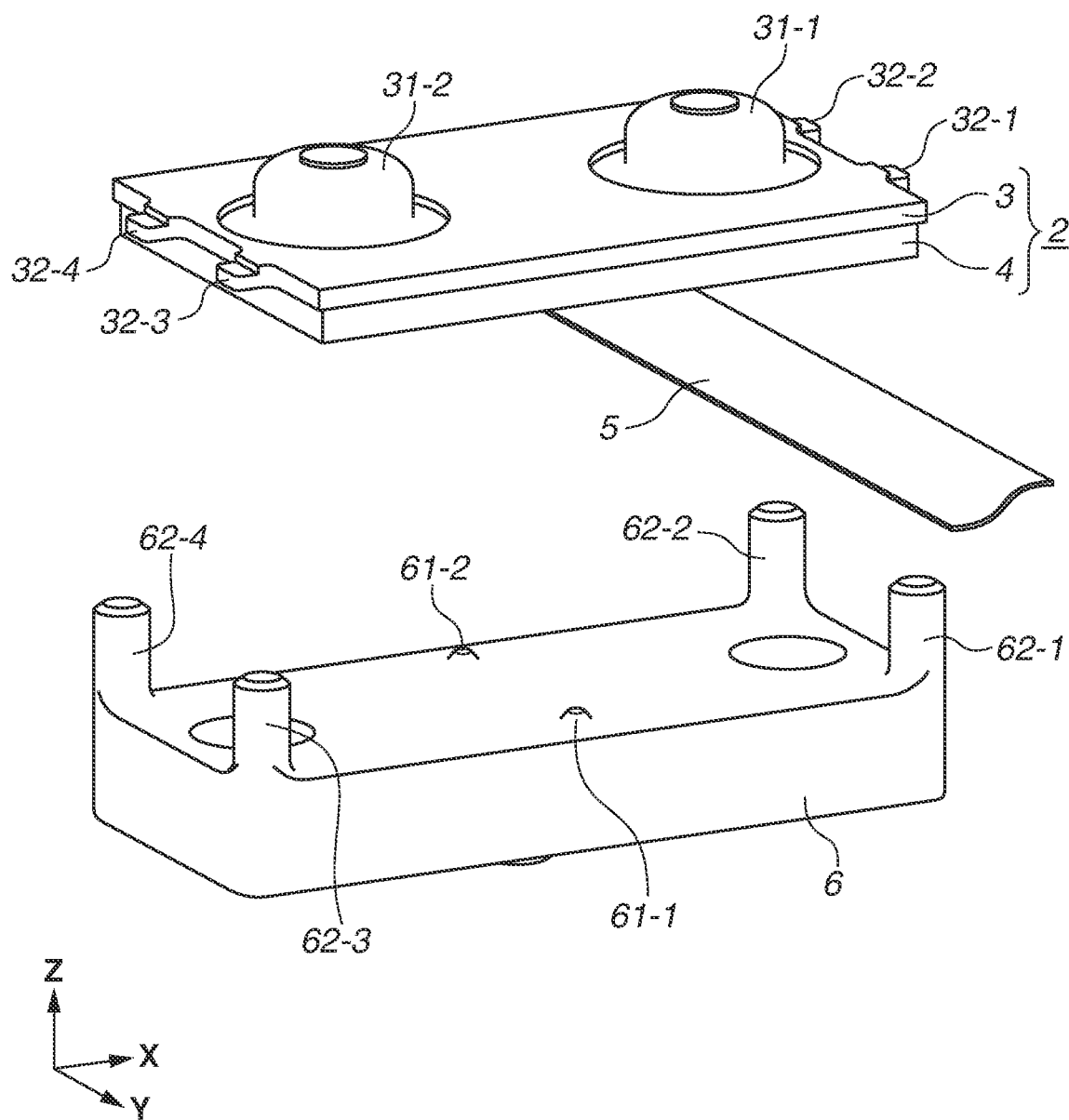
FIG. 4 is an exploded perspective view illustrating a vibrator and a pressing member according to the first exemplary embodiment of the present invention.

In order to efficiently drive the vibration wave motor 1, the vibrator 2 needs to be supported not to disturb vibration (displacement) in the two vibration modes that are excited in the vibrator 2. To this end, it is desirable to support a node neighborhood of the two vibration modes. Thus, in order to selectively press and hold a common node of the two vibration modes that are excited in the vibrator 2, the pressing member 6 includes two protrusions 61-1 and 61-2 as illustrated in FIG. 4. The phrase "selectively support a node" mainly refers to selecting an adequately limited portion of a region where a node is generated in the vibrator 2 and supporting the selected region of the vibrator 2 with the pressing member 6 while the rest of the region is not supported by the pressing member 6 or another member, instead of supporting the vibrator 2 (or flexible print substrate 5) thoroughly along a node line of a vibration wave with the pressing member 6 as in a conventional technique. The pressing member 6 may include a plurality of protrusions 61 such as two, three, four or more.

Figure 6A:
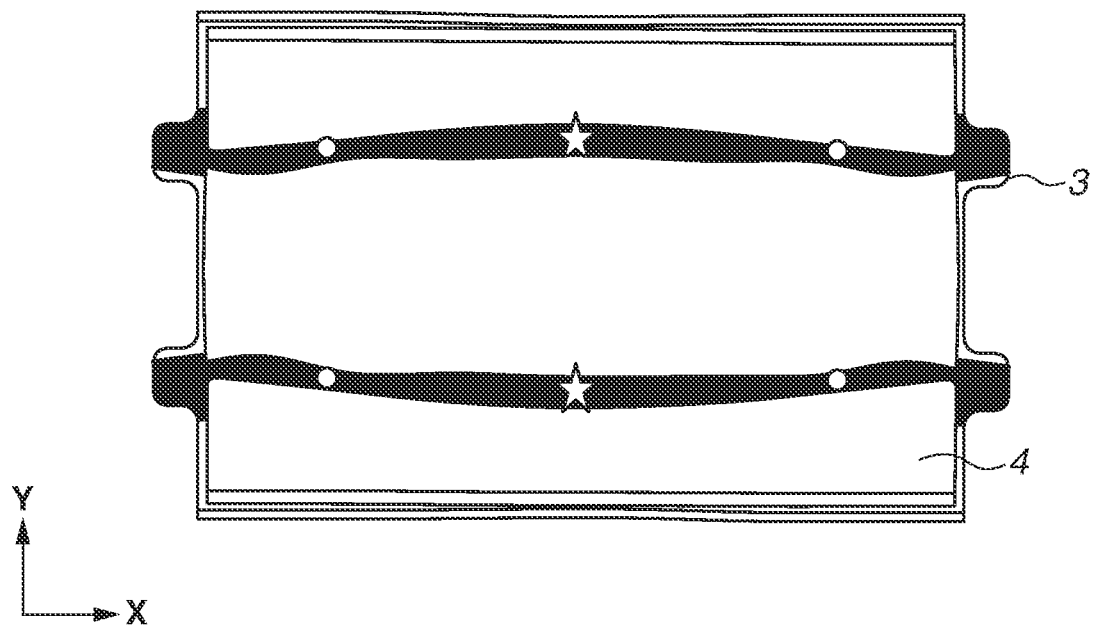
FIGS. 6A and 6B are views illustrating node positions in the vibration modes according to the first exemplary embodiment, a second and a third exemplary embodiments of the present invention.
Figure 6B:
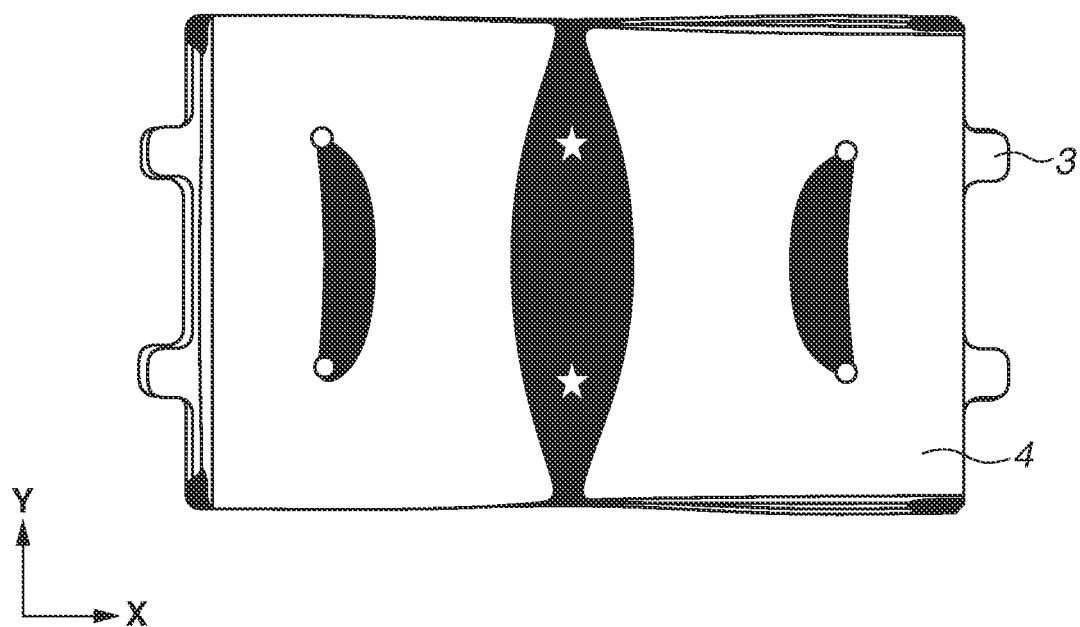

FIGS. 6A and 6B illustrate contact positions and node positions in the respective vibration modes. For simplification, the flexible print substrate 5 is not illustrated.

In FIGS. 6A and 6B, black areas denote node neighborhoods. Specifically, each area with a displacement that is not greater than 35% of a maximum displacement in the respective vibration modes is displayed in black. In the present exemplary embodiment, an area with a displacement that is not greater than 35% of the maximum displacement is defined as a node neighborhood. When the modes A and B are superimposed, there are six places (four circles and two starts) where black portions overlap, i.e., common node neighborhoods. Among the six places, the two places that are denoted by the stars are desirable for supporting the vibrator 2 more efficiently from the following two viewpoints. First, the displacement is smaller in the two places than in the other four places. Next, since a pressing force is applied only to a single point in the X-direction in the ZX-cross-section, a function of equalizing the projections 31-1 and 31-2 and the slider 9 about the Y-axis can be included to uniformize the contact.

In other words, the structure is employed in which an area with a displacement that is not greater than 35% of the maximum displacement in the respective vibration modes is supported and an area with a displacement that is greater than 35% of the maximum displacement of the respective vibration modes is not supported.

For this reason, the portions denoted by the starts in FIGS. 6A and 6B are selectively brought into contact with the protrusions 61-1 and 61-2 so that a pressing force is applied to the vibrator 2 more efficiently than that in the structure in which a pressing force is uniformly applied to a rear surface of a vibrator to support the rear surface. Furthermore, a frictional force generated between the protrusions 61-1 and 61-2 and the vibrator 2 holds the vibrator 2 in the X- and Y-directions. In the present exemplary embodiment, the flexible print substrate 5 of the vibrator 2 is in contact with the protrusions 61-1 and 61-2, and the pressing force and a friction coefficient are adjusted so that the value of a maximum static frictional force of the flexible print substrate 5 and the protrusions 61-1 and 61-2 is constantly greater than the thrust force generated at the slider 9. With the protrusions 61-1 and 61-2, a pressing force is applied as though the vibrator 2 is in point contact, so that the movement of the vibrator 2 with respect to the pressing member 6 while the vibration wave motor 1 is driven is significantly reduced.

Meanwhile, the pressing member 6 includes four loose fitting portions 62 (62-1, 62-2, 62-3, 62-4), which support an outer periphery of the vibrator 2 with a backlash (four loose fitting portions 62 are loosely fitted to the outer periphery of the vibrator 2). The loose fitting portions 62 function as a stopper used in positioning during assembly of the vibrator 2 or when an external force is exerted on the slider 9.

Further, the loose fitting portions 62 can be in contact with two positions of the outer periphery of the vibrator 2 that are different from the nodes of the vibration. However, in this structure, the maximum static frictional force of the flexible print substrate 5 and the protrusions 61-1 and 61-2 is greater than the thrust force generated on the slider 9 as described above. For this reason, a force in the X- and Y-directions is not exerted on the contact portions of the loose fitting portions 62 and the vibrator 2, so that the loss is ignorable and is not likely to cause a problem in driving.

Since the protrusions 61 of the pressing member 6 are brought into direct contact with the node neighborhoods of the vibrator 2 and the loose fitting portions 62 are brought into direct contact with the outer periphery of the vibrator 2 as described above, a desirable material of the pressing member 6 is a resin that has high vibration insulation properties to prevent abnormal noise. A desirable material of the protrusions 61 is a material that has a high friction coefficient in order to increase the holding force of the vibrator 2 for the above-described reason, whereas a desirable material of the loose fitting portions 62 is a material that has a small friction coefficient in order to reduce the friction loss with the vibrator 2. Thus, a coating that increases the friction coefficient can be applied to the protrusions 61, and a coating that decreases the friction coefficient can be applied to the loose fitting portions 62. Further, another component having a desirable friction coefficient for each of the protrusions 61 and the loose fitting portions 62 can be attached by bonding or press-fitting.

Figure 5:
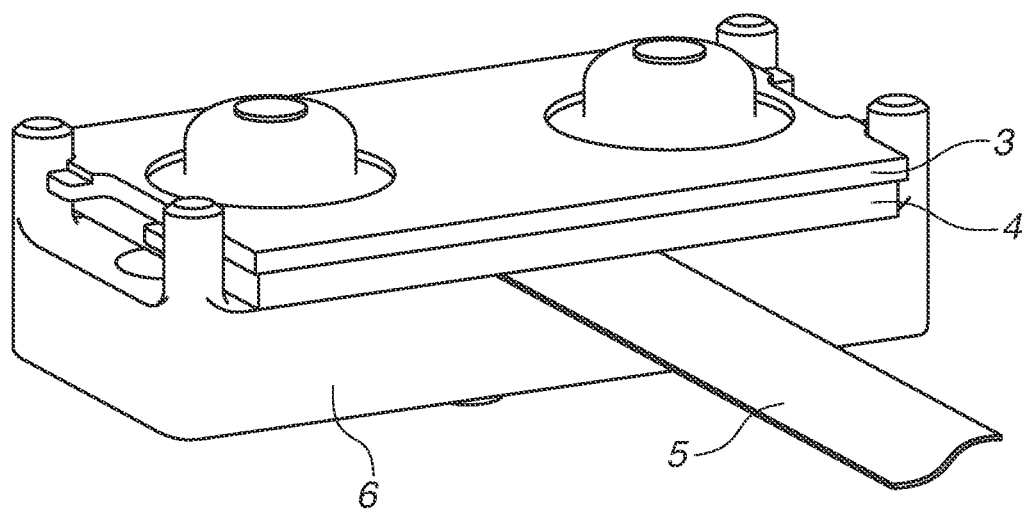
FIG. 5 is an assembly perspective view illustrating the vibrator and the pressing member according to the first exemplary embodiment of the present invention.
Figure 5:
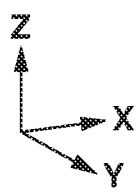

In FIGS. 4 and 5, the shorter sides of the vibrator 2 are loosely fitted in the X-direction and four extending portions 32 (32-1, 32-2, 32-3, 32-4) of the elastic member 3 are loosely fitted in the Y-direction, in order to minimize the size of the vibration wave motor 1. The extending portions 32 extend in the X-direction from the node positions in the mode A in order to minimize the vibration displacement. However, the positions are different from the node positions in the mode B.

Figure 7:
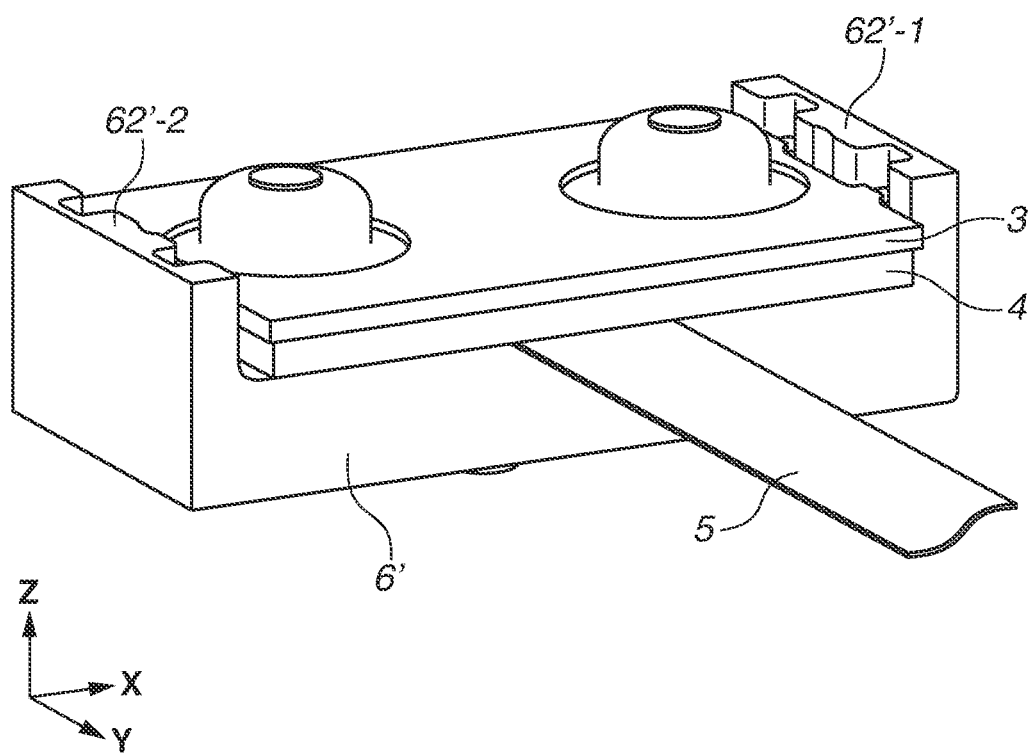
FIG. 7 is an assembly perspective view illustrating the vibrator and the pressing member according to the first exemplary embodiment of the present invention.

In a case where the elastic member 3 and the piezoelectric element 4 are bonded with an adhesive, the adhesive is sometimes hardened with some stray adhesive protruding from an edge portion of bonded surfaces as a result of applying the adhesive to the entire bonded surfaces. Accurate positioning of the vibrator 2 in the X-direction can become difficult depending on the amount of the stray adhesive. On the contrary, only the extending portions 32 are loosely fitted in the X- and Y-directions as illustrated in FIG. 7 to thereby enable accurate positioning of the vibrator 2 in the X-direction even in the above-described case. In this way, the protrusions 61 can be accurately brought into contact with the common nodes (indicated by stars) of the vibrator 2.

More specifically, the elastic member is substantially rectangular and includes a rectangular portion and at least two extending portions that are independent of each other, and the supporting member includes a projection in contact with the rectangular portion and the extending portions. The plurality of projections is loosely fitted to four corners of the rectangular portion of the elastic member to support the vibrator so that a rigid supporting structure is realized.

As described above, in the present exemplary embodiment, the vibrator 2 is positioned using the loose fitting portions 62 of the pressing member 6, and the vibrator 2 is held by a frictional force between the protrusions 61 and the vibrator 2, so that arm portions and joints discussed in Japanese Patent Application Laid-Open No. 2015-43668 are not needed. With this configuration, the following five advantages can be expected.

The first advantage is that the size of the vibrator 2 in the X-direction, i.e., the driving direction of the driven member, is reduced. The size in the present exemplary embodiment is about 40% smaller than that in Japanese Patent Application Laid-Open No. 2015-43668 due to the absence of arm portions and joints.

The second advantage is that the shape of the vibrator 2 is simplified and the number of unnecessary vibration modes is reduced due to the absence of arm portions and joints of the vibrator. While there are sixteen unnecessary vibration modes up to 120 kHz including two vibration modes of the audible range in Japanese Patent Application Laid-Open No. 2015-43668, there are only four unnecessary vibration modes outside the audible range in the present exemplary embodiment. Thus, the risk of causing abnormal noise due to direct excitation of a vibration mode of the audible range or excitation of a frequency of a difference between a driving frequency and an unnecessary vibration mode is significantly reduced.

The third advantage is that the number of components is reduced. The two holding members and the buffer member in Japanese Patent Application Laid-Open No. 2015-43668 and the biasing spring in Japanese Patent Application Laid-Open No. 2017-200260 are not needed, so that the costs of components and assembly of the vibration wave motor 1 are reduced.

The fourth advantage is that the motor performance increases. The constraints on the node neighborhoods are similar to those in Japanese Patent Application Laid-Open No. 2015-43668. In order to ensure strength, the technique discussed in Japanese Patent Application Laid-Open No. 2015-43668 requires an area bonded to the holding member. This suppresses vibrations and decreases the maximum speed and the thrust force. In the present exemplary embodiment, the joints are not welded or bonded but in pressure contact with the nodes of the vibrator 2, so that the maximum speed, thrust force, efficiency, and temperature stability are all better than those of a conventional vibration wave motor.

The fifth advantage is that the cost of components is reduced. In a case where the elastic member 3 is manufactured by press molding, since the mold becomes simple and dimension management becomes easy, the elastic member 3 is manufactured with ease.

As described above, the present exemplary embodiment provides a vibration wave motor that is smaller in size, includes fewer components, and has a lower risk of producing abnormal noise than the conventional vibration wave motor.

A method of generating elliptic motion or circular motion on a contact surface in the linear-type vibration wave motor according to the present exemplary embodiment of the present invention is not limited to the method described above. For example, vibrations of bending vibration modes that are different from those described above can be combined, or a vibration of a longitudinal vibration mode in which an elastic member is elongated and contracted in the longitudinal direction and a vibration of a bending vibration mode may be combined.

Any driving method for generating elliptic motion or circular motion on a contact surface by combining a vibration mode of displacing the contact surface in the movement direction of the driven member and a vibration mode of displacing the contact surface in the pressing direction can be used only if the vibration wave motor includes a common node for pressing and holding.

Figure 8:
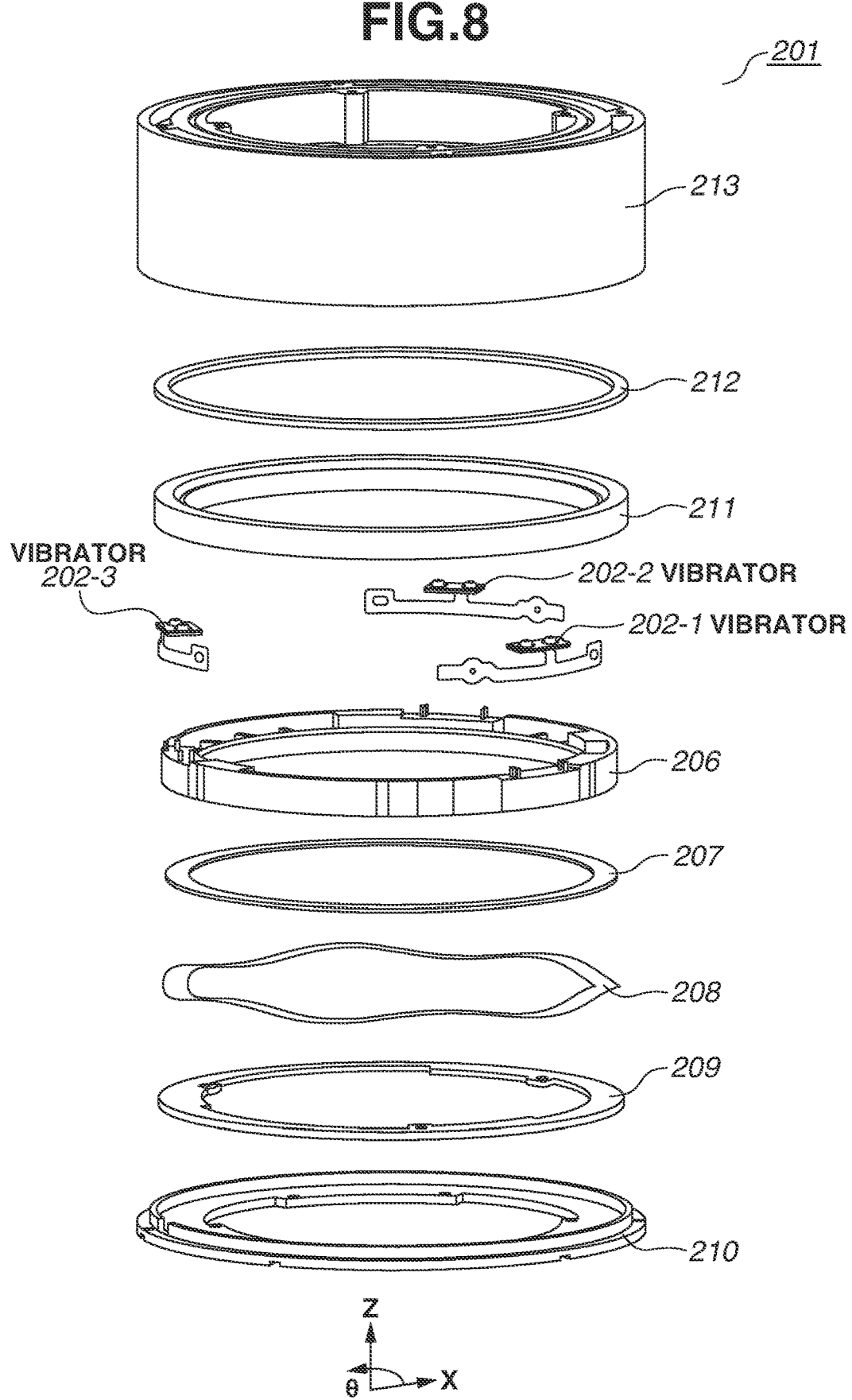
FIG. 8 is an exploded perspective view illustrating a vibration wave motor according to the second exemplary embodiment of the present invention.
Figure 9:
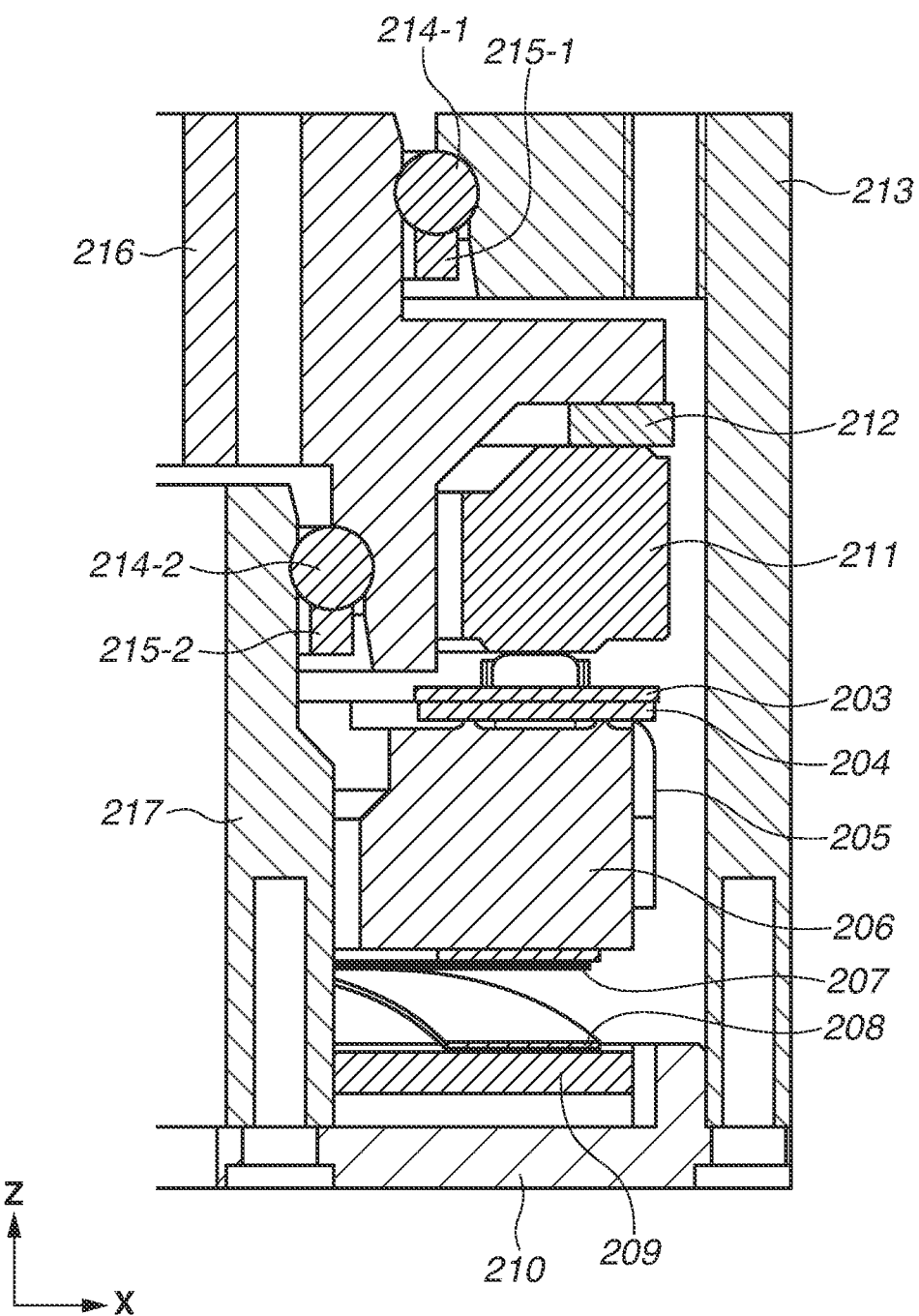
FIG. 9 is a cross-sectional view illustrating the vibration wave motor according to the second exemplary embodiment of the present invention.
Figure 10:
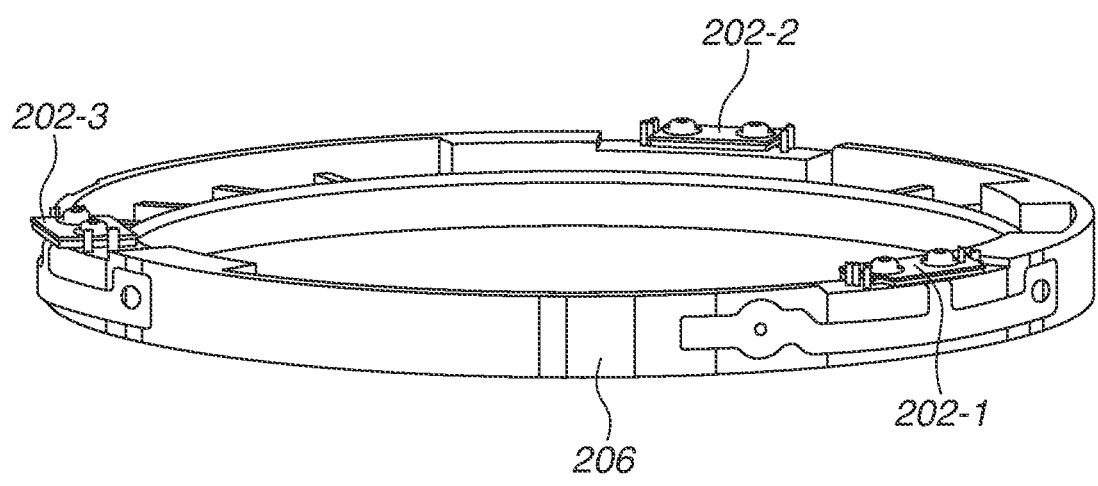
FIG. 10 is a perspective view illustrating a vibrator and a ring base according to the second exemplary embodiment of the present invention.

Now, a second exemplary embodiment will be described with reference to FIGS. 8 to 10. FIG. 8 is an exploded perspective view illustrating a vibration wave motor according to the second exemplary embodiment of the present invention, and a radial direction is defined as an X-direction, a rotation direction as a θ-direction, and a pressing direction as a Z-direction. Further, FIG. 9 is a ZX-cross-sectional view illustrating the vibration wave motor according to the second exemplary embodiment of the present invention.

A feature of the present exemplary embodiment is that three vibrators 202 (202-1, 202-2, 202-3) are held by a ring base 206. The structure and driving principle of the vibrators 202 are similar to those in the first exemplary embodiment, so that description thereof is omitted.

On the ring base 206, three sets of protrusions and loose fitting portions having a similar function to that in the first exemplary embodiment are disposed at intervals of 120 degrees and are each loosely fitted to the vibrator 202 to hold the vibrator 202. Flexible print substrates of the respective vibrators 202 are connected by a connecting flexible print substrate (not illustrated), and the same driving voltage is applied to piezoelectric elements.

A rotor 211, which is a driven member, is brought into contact with projections of the vibrators 202, a driving force generated in the tangential direction rotates the rotor 211. An antivibration rubber 212 is placed on top of the rotor 211, and the antivibration rubber 212 and the rotor 211 are held to be rotated together with an output transmission member 216.

The annular ring base 206 is combined with an internal cylinder 217 in an area (not illustrated) to regulate movements in a central axis direction and the radial direction and rotations about a central axis.

An auxiliary pressing member 207 having predetermined rigidity is disposed under the ring base 206 and uniformizes a pressing force from a wave washer 208, which is a pressing member. The pressing force reception member 209 is disposed under the wave washer 208.

Inside of the pressing force reception member 209 is engaged with the internal cylinder 217 with a screw or bayonet structure. In a vibration wave motor 201, the wave washer 208 is compressed by rotating the pressing force reception member 209 to move the pressing force reception member 209 in the central axis direction. The structure from the ring base 206 to the output transmission member 216 is pressed by and sandwiched between an external cylinder 213 and the internal cylinder 217, and the pressing force reception member 209. Balls 214 and retainers 215 are disposed between the external cylinder 213 and the internal cylinder 217, and the output transmission member 216, and rotatably support the output transmission member 216 while being pressed. The external cylinder 213 and the internal cylinder 217 are connected by screwing a cover 210.

The present exemplary embodiment is more advantageous than the rotation type (FIG. 9) discussed in Japanese Patent Application Laid-Open No. 2015-43668 in that a holding member 13 and a buffer member 14 are not used and the function of equalization about the X-axis is included. This substantially uniformizes the pressing between projections (loose fitting portions 62), and realizes high performance stability and controllability due to the absence of a backlash in the θ-direction. Other advantages are similar to those of the first exemplary embodiment.

While the case where three vibrators 202 are included is described in the present exemplary embodiment, the number of vibrators 202 is not limited to three and can be any number that is one or more and can be arranged on the ring base 206.

Figure 11:
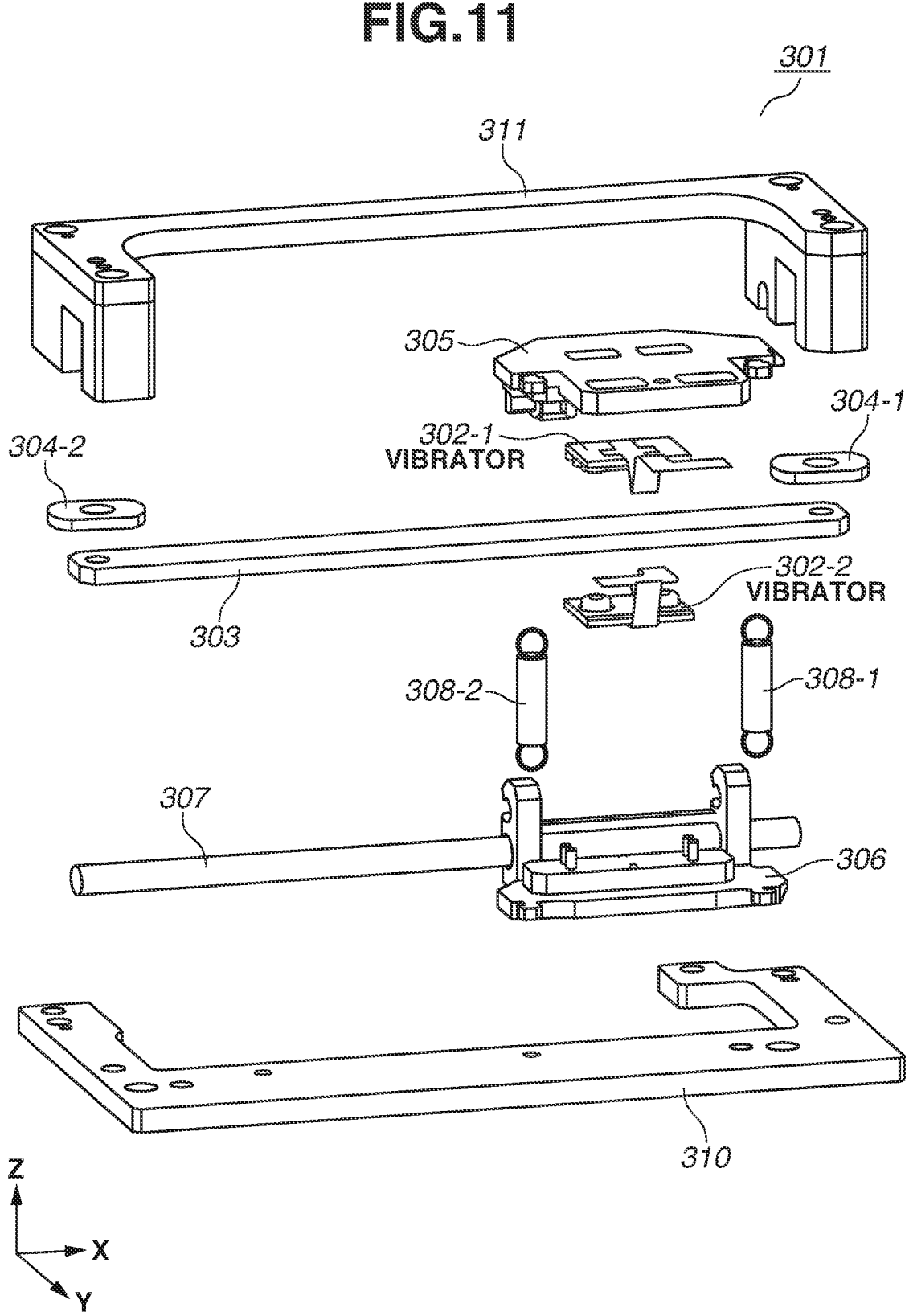
FIG. 11 is an exploded perspective view illustrating a vibration wave motor according to the third exemplary embodiment of the present invention.
Figure 12:
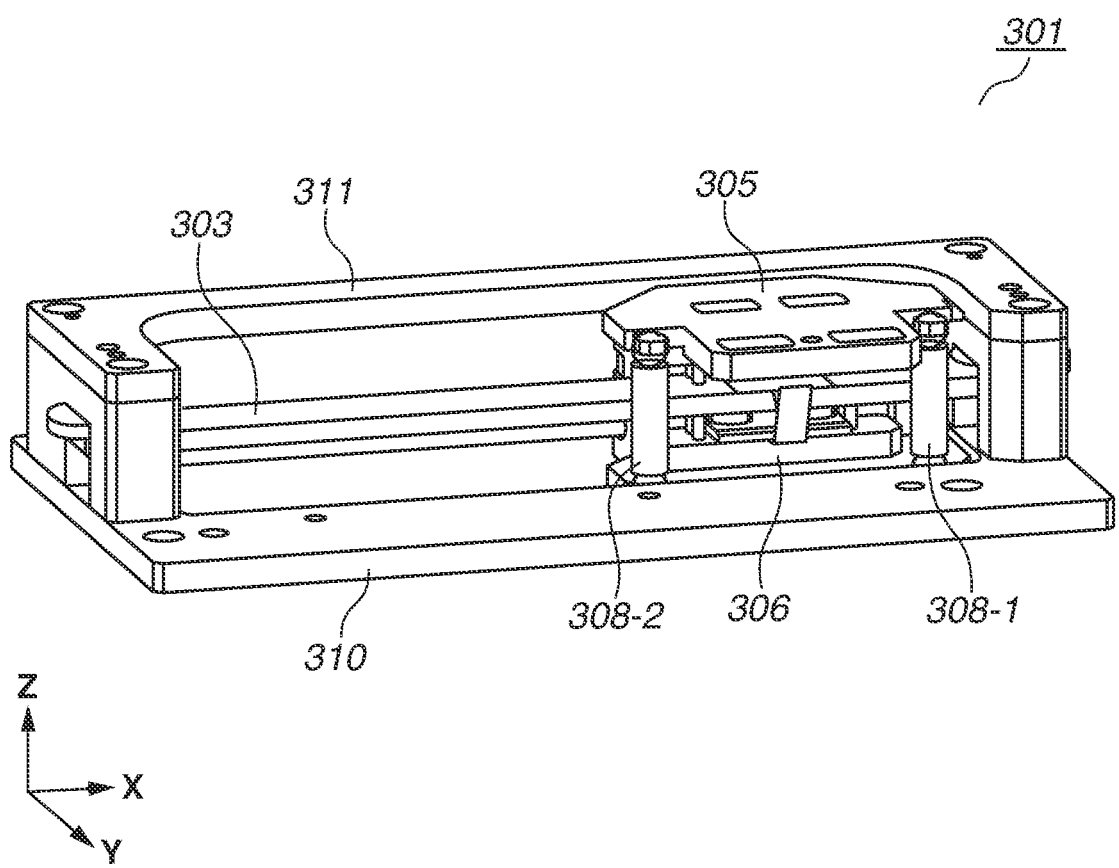
FIG. 12 is an assembly perspective view illustrating the vibration wave motor according to the third exemplary embodiment of the present invention.

In a third exemplary embodiment, a case where a friction plate 303, which is a beam-shaped contact member of a vibration wave motor 301, is sandwiched between two vibrators 302 will be described. A movement direction of the vibrators 302 is defined as an X-direction, a pressing direction as a Z-direction, and a direction that is perpendicular to the X- and Z-directions as a Y-direction. The structure and driving principle of the vibrators 302 are similar to those in the first exemplary embodiment, so that description thereof is omitted. FIG. 11 is an exploded perspective view illustrating a vibration wave motor according to the third exemplary embodiment, and FIG. 12 is an assembly perspective view.

The vibrator 302-1 is pressed downward in FIG. 11 by an upper pressing member 305, and the vibrator 302-2 is pressed upward by a lower pressing member 306. The vibrators 302-1 and 302-2 are each in contact with the friction plate 303, which is a beam-shaped contact member. The friction plate 303 is fixed to a friction plate holder 311 via an antivibration rubber 304. The upper pressing member 305 and the lower pressing member 306 are engaged rotatably about the X-axis, and a pressing force is applied to the upper pressing member 305 and the lower pressing member 306 by a tensile spring 308 (308-1, 308-2). The upper pressing member 305 and the lower pressing member 306 receive a pressing reaction force from each other and have a function of the pressing force reception member. A coil portion of the tensile spring 308 is not illustrated to simplify the drawing.

The lower pressing member 306 is engaged with a guide bar 307 and supported thereby slidably in the X-direction while movements in the Z and Y-directions are regulated. The guide bar 307 is sandwiched between the friction plate holder 311 and a fixed member 310 and fixed.

Flexible print substrates of the vibrators 302-1 and 302-2 are connected by a connecting flexible print substrate (not illustrated), and the same driving voltage is applied to piezoelectric elements. A thrust force is generated in the X-direction by the elliptic motion or circular motion generated at projections of the vibrators 302, and the vibrators 302, the upper pressing member 305, the lower pressing member 306, and the tensile spring 308 are moved together in the X-direction.

A vibration wave motor can be used for, for example, driving a lens of an image capturing apparatus (optical device). In a fourth exemplary embodiment, an image capturing apparatus that uses a vibration wave motor to drive a lens arranged in a lens barrel will be described below.

Figure 13A:
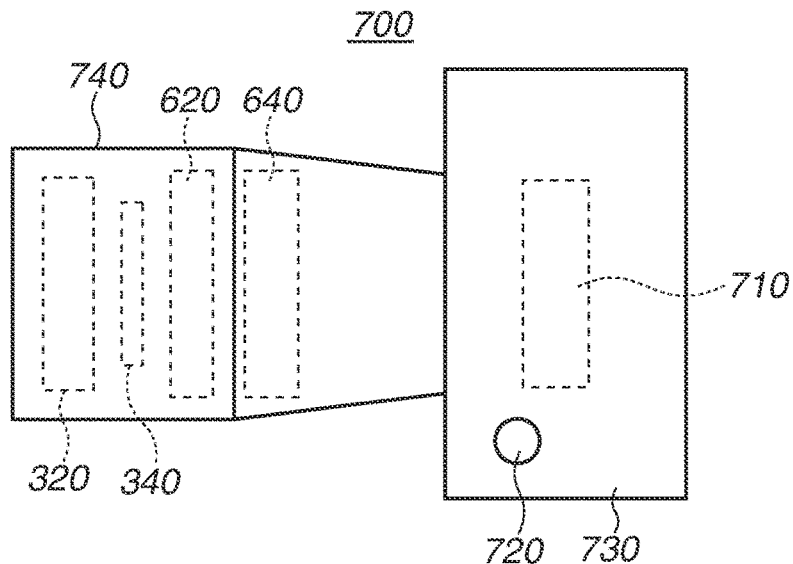
FIGS. 13A and 13B are a top view and a block diagram illustrating a schematic structure of an image capturing apparatus that uses a vibration wave motor, according to a fourth exemplary embodiment of the present invention.

FIG. 13A is a top view illustrating a schematic structure of an image capturing apparatus 700. The image capturing apparatus 700 includes a camera body 730. The camera body 730 includes an image sensor 710 and a power button 720. The image capturing apparatus 700 further includes a lens barrel 740. The lens barrel 740 includes a first lens group (not illustrated), a second lens group 320, a third lens group (not illustrated), a fourth lens group 340, and vibration-type driving devices 620 and 640. The lens barrel 740 can be replaced as an interchangeable lens, and the lens barrel 740 that is suitable for an image capturing target can be mounted on the camera body 730. In the image capturing apparatus 700, the two vibration-type driving devices 620 and 640 respectively drive the second lens group 320 and the fourth lens group 340.

While details of a structure of the vibration-type driving device 620 are not illustrated, the vibration-type driving device 620 includes a vibration wave motor and a vibration wave motor driving circuit. The rotor 211 is arranged in the lens barrel 740 so that the radial direction becomes substantially orthogonal to an optical axis. The vibration-type driving device 620 rotates the rotor 211 about the optical axis and converts the rotation output of the driven member into a straight movement in the optical axis direction via a gear (not illustrated) to move the second lens group 320 in the optical axis direction. The vibration-type driving device 640 has a similar structure to the structure of the vibration-type driving device 620 and moves the fourth lens group 340 in the optical axis direction.

Figure 13B:
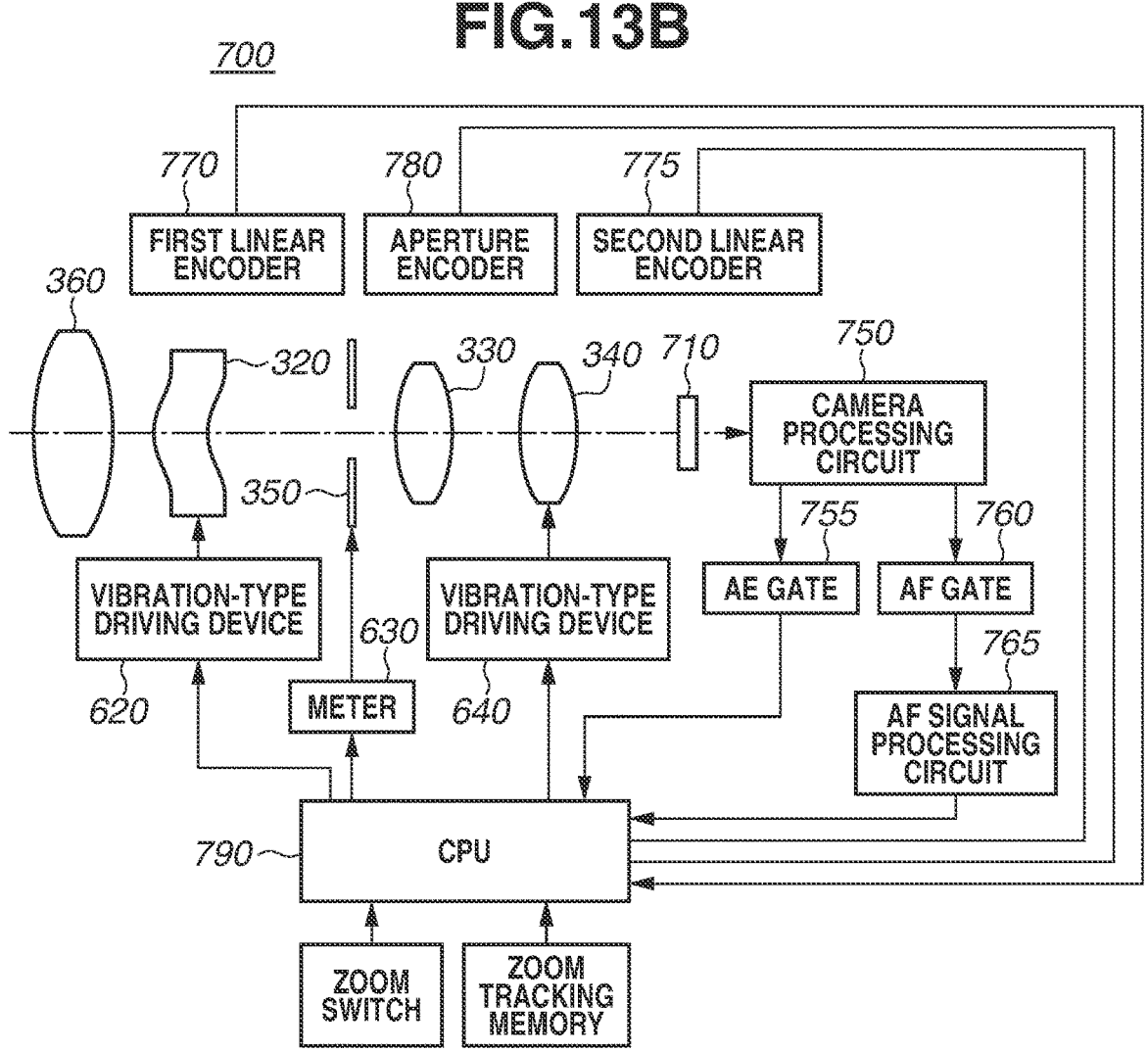

FIG. 13B is a block diagram illustrating a schematic structure of the image capturing apparatus 700. A first lens group 360, the second lens group 320, a third lens group 330, the fourth lens group 340, and a light quantity adjustment unit 350 are arranged at predetermined positions on the optical axis in the lens barrel 740. Light having passed through the first lens group 360 to the fourth lens group 340 and the light quantity adjustment unit 350 forms an image on the image sensor 710. The image sensor 710 converts an optical image into an electric signal and outputs the electric signal, and the output is transmitted to a camera processing circuit 750.

The camera processing circuit 750 performs amplification and gamma correction on the output signal from the image sensor 710. The camera processing circuit 750 is connected to a central processing unit (CPU) 790 via an auto-exposure (AE) gate 755 and is also connected to the CPU 790 via an auto-focus (AF) gate 760 and an AF signal processing circuit 765. A video signal having undergone predetermined processing performed by the camera processing circuit 750 is transmitted to the CPU 790 via the AE gate 755, the AF gate 760, and the AF signal processing circuit 765. The AF signal processing circuit 765 extracts a high-frequency component from the video signal, generates an evaluation value signal for AF, and feeds the generated evaluation value to the CPU 790.

The CPU 790 is a control circuit that controls overall operations of the image capturing apparatus 700 and generates a control signal for exposure determination or focusing from an acquired video signal. The CPU 790 controls the driving of the vibration-type driving devices 620 and 640 and a meter 630 to adjust the positions of the second lens group 320, the fourth lens group 340, and the light quantity adjustment unit 350 in the optical axis direction in order to achieve a determined exposure amount and a suitable focused state. Under control of the CPU 790, the vibration-type driving device 620 moves the second lens group 320 in the optical axis direction, the vibration-type driving device 640 moves the fourth lens group 340 in the optical axis direction, and the meter 630 controls driving of the light quantity adjustment unit 350.

The position of the second lens group 320 in the optical axis direction that is driven by the vibration-type driving device 620 is detected by a first linear encoder 770, and the CPU 790 is notified of the detection result so that the detection result feeds back to the driving of the vibration-type driving device 620. Similarly, the position of the fourth lens group 340 in the optical axis direction that is driven by the vibration-type driving device 640 is detected by a second linear encoder 775, and the CPU 790 is notified of the detection result so that the detection result feeds back to the driving of the vibration-type driving device 640. The position of the light quantity adjustment unit 350 in the optical axis direction is detected by an aperture encoder 780, and the CPU 790 is notified of the detection result so that the detection result feeds back to the driving of the meter 630.

As described above, an electronic apparatus includes a member and any one of the vibration wave motors described above that drives the member, whereby a more compact electronic apparatus is achieved.

The present invention is applicable to an optical device, such as a camera, and various electronic apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-101748, filed May 30, 2019, which is hereby incorporated by reference herein in its entirety.

What is claimed is:

1. A vibration wave motor, comprising:
a vibrator including an electrical-mechanical energy conversion element and an elastic member that includes a rectangular portion and at least two extending portions;
a contact member in contact with the elastic member; and
a supporting member that includes a plurality of protrusions, and that includes a plurality of projections in contact with the rectangular portion and the at least two extending portions to supports the vibrator,
wherein the plurality of projections of the supporting member is loosely fitted to the rectangular portion of the elastic member so as to be movable along a direction in which the vibrator is pressed toward the contact member, and the plurality of protrusions selectively supports a node of a vibration of the vibrator.

2. The vibration wave motor according to claim 1, wherein the supporting member includes a protrusion that applies a pressing force to a common node of two different vibration modes of the vibrator.

3. The vibration wave motor according to claim 2, wherein a maximum static frictional force acting between the protrusion and the vibrator is greater than a thrust force acting on the contact member.

4. The vibration wave motor according to claim 1, wherein the supporting member supports an area of the vibrator with a displacement that is not greater than 35% of a maximum displacement in a standing-wave vibration of the vibrator, whereas the supporting member does not support an area of the vibrator with a displacement that is greater than 35% of the maximum displacement.

5. The vibration wave motor according to claim 1, wherein the plurality of projections is loosely fitted to four corners of the rectangular portion of the elastic member to support the vibrator.

6. The vibration wave motor according to claim 1, wherein the supporting member includes a pressing member in contact with the vibrator, a spring that applies a pressing force to the pressing member, and a base that supports the spring and receives the pressing force.

7. The vibration wave motor according to claim 6,
wherein the contact member and the base have an annular shape, and
wherein a plurality of the vibrators is provided to the base so as to contact the contact member.

8. The vibration wave motor according to claim 1, further including another vibrator,
wherein the vibrator and aid another vibrator are arranged to sandwich the contact member, and
wherein the vibrator and said another vibrator are respectively pressed by two pressing members, and a pressing force is applied to the two pressing members by a tensile spring.

9. The vibration wave motor according to claim 8, wherein the vibrators drive the contact member having a beam shape linearly.

10. An optical apparatus, comprising:
a lens; and
the vibration wave motor according to claim 1.

11. An electronic apparatus, comprising:
a member; and
the vibration wave motor according to claim 1 that drives the member.

* * * * *